United States Patent
Moses et al.

(10) Patent No.: US 7,148,460 B2
(45) Date of Patent: *Dec. 12, 2006

(54) MULTI-CHANNEL DETECTOR READOUT METHOD AND INTEGRATED CIRCUIT

(75) Inventors: William W. Moses, Berkeley, CA (US); Eric Beuville, Santa Barbara, CA (US); Marzio Pedrali-Noy, San Diego, CA (US)

(73) Assignee: The Regents of the University of California, Oakland, CA (US)

( * ) Notice: Subject to any disclaimer, the term of this patent is extended or adjusted under 35 U.S.C. 154(b) by 1 day.

This patent is subject to a terminal disclaimer.

(21) Appl. No.: 10/809,931

(22) Filed: Mar. 25, 2004

(65) Prior Publication Data

US 2004/0251400 A1    Dec. 16, 2004

Related U.S. Application Data

(63) Continuation of application No. 09/966,811, filed on Sep. 27, 2001, now Pat. No. 6,737,627, which is a continuation of application No. PCT/US00/08681, filed on Mar. 30, 2000.

(60) Provisional application No. 60/127,199, filed on Mar. 31, 1999.

(51) Int. Cl.
*H01J 40/14*    (2006.01)

(52) U.S. Cl. .................. 250/214 R; 250/208.1

(58) Field of Classification Search ............ 250/214 R, 250/214.1, 208.1; 348/294, 295, 302, 304, 348/320

See application file for complete search history.

(56) References Cited

U.S. PATENT DOCUMENTS

| | | | |
|---|---|---|---|
| 4,219,845 A | 8/1980 | Gibbons et al. | |
| 4,322,752 A | 3/1982 | Bixby | |
| 4,638,354 A | 1/1987 | Denimal | |
| 4,963,963 A * | 10/1990 | Dorman ...................... | 348/164 |
| 5,301,240 A | 4/1994 | Stockum et al. | |
| 5,561,287 A | 10/1996 | Turner et al. | |
| 5,778,307 A * | 7/1998 | Budnik ...................... | 455/103 |
| 5,847,396 A | 12/1998 | Lingren et al. | |
| 6,737,627 B1 * | 5/2004 | Moses et al. ............ | 250/208.1 |

FOREIGN PATENT DOCUMENTS

| | | |
|---|---|---|
| EP | 0157141 A | 9/1985 |
| EP | 0260858 A | 3/1988 |
| EP | 0 349 027 | 1/1990 |
| WO | WO 8403810 A | 9/1984 |
| WO | WO89/01129 | 2/1989 |

OTHER PUBLICATIONS

Moses, W. W., et al.; A 16-Channel Charge Sensitive Amplifier IC for a PIN Photoarray Based Pet . . . , IEEE Trans. on Nuc. Sci., Aug. 1994, V. 41, Issue 4, pp. 1469-1472.

(Continued)

*Primary Examiner*—Que T. Le
(74) *Attorney, Agent, or Firm*—Joseph R. Milner

(57) ABSTRACT

An integrated circuit which provides multi-channel detector readout from a detector array. The circuit receives multiple signals from the elements of a detector array and compares the sampled amplitudes of these signals against a noise-floor threshold and against one another. A digital signal is generated which corresponds to the location of the highest of these signal amplitudes which exceeds the noise floor threshold. The digital signal is received by a multiplexing circuit which outputs an analog signal corresponding the highest of the input signal amplitudes. In addition a digital control section provides for programmatic control of the multiplexer circuit, amplifier gain, amplifier reset, masking selection, and test circuit functionality on each input thereof.

20 Claims, 3 Drawing Sheets

OTHER PUBLICATIONS

Moses, W.W., et al.; A "Winner-Take-All" IC for Determining the Crystal of Interaction in Pet . . . , IEEE Trans. on Nuc. Sci., Jun. 1, V. 43, Issue 3, Part 2, pp. 1615-1618.

D. Panogiotopoulos, "Microprocessing and Microprogramming," The VLSI Design of a Two Dimensional Image Processing Array, vol. 14 (No. 3), p. 125-132, (Oct. 1, 1984).

Translation of Abstract of Case No. EU0157141A1.

* cited by examiner

MULTI-CHANNEL DETECTOR READOUT METHOD AND INTEGRATED CIRCUIT

CROSS-REFERENCE TO RELATED APPLICATIONS

This application is a continuation of U.S. application Ser. No. 09/966,811 filed on Sep. 27, 2001, now U.S. Pat. No. 6,737,627, incorporated herein by reference, which claims priority from, and is a 35 U.S.C. § 111(a) continuation of, PCT international application Ser. No. PCT/US00/08681 filed on Mar. 30, 2000 which designates the U.S., incorporated herein by reference, and which claims priority from U.S. provisional application Ser. No. 60/127,199 filed on Mar. 31, 1999, incorporated herein by reference.

STATEMENT REGARDING FEDERALLY SPONSORED RESEARCH OR DEVELOPMENT

This invention was made with U.S. Government support under Contract No. DE-AC03-76SF00098 between the U.S. Department of Energy and the University of California for operation of Lawrence Berkeley Laboratory. The government may have certain rights in this invention.

INCORPORATION-BY-REFERENCE OF MATERIAL SUBMITTED ON A COMPACT DISC

Not Applicable

NOTICE OF MATERIAL SUBJECT TO COPYRIGHT PROTECTION

A portion of the material in this patent document is subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. § 1.14.

BACKGROUND OF THE INVENTION

1. Field of the Invention

This invention pertains generally to pixelated detector imaging circuits, and more particularly to a method and apparatus for selecting an input channel with the highest signal amplitude from an array of detector input channels.

2. Description of the Background Art

Multi-channel solid state readouts are widely used in image detection applications where each pixel in a detector array is sensed independently from one another. Such readouts typically receive inputs from detector arrays and process the inputs to identify and selectively pass an analog signal corresponding to the highest amplitude input signal received. Within these systems the identification of a single cell containing the signal is resolved despite being constrained with signal levels which are not significantly higher than the noise level, and the existence of spurious signals within the other detector cells.

For example, a multichannel readout is commonly used in connection with a pixelated gamma camera which detects 140 keV photons resulting from positron annihilation. Such a detector couples a photodiode array to an array of scintillator crystals. Gamma ray interaction within one crystal of the scintillator array causes the appropriate cell of the photodiode array to produce a signal which is measured to determine in which crystal cell the interaction occurred and whether the energy deposited in that cell was consistent with a 140 keV photon.

Rapid sensing of the interaction within the scintillator array is required so that events are correctly registered and not missed. One accepted approach to providing for rapid sensing has been to feed the output from each detector cell into a multiplexer and a "winner-take-all" (WTA) circuit that identifies the highest amplitude signal and activates the multiplexer to pass that signal to the output. Since the device reads the detector cells in parallel to determine the highest amplitude cell, it has the capability of providing faster cycle times than a system which reads detector outputs serially.

Unfortunately creating a workable integrated circuit that can receive inputs from more than approximately sixteen detectors has posed a challenge. Mixing analog and digital circuitry within an IC layout causes moderate to severe noise problems that reduce the accuracy of the results and create erratic switching responses. In addition, the incorporation of a large multi-channel solid-state detector readout into a system brings about serious difficulties relating to control and testing issues.

Those skilled in the art will appreciate, therefore, that mixing analog and digital circuitry in an integrated circuit created noise or coupling problems that are very difficult to solve. While noise reduction has traditionally been addressed by careful circuit layout, there is a large penalty for failure due to the time and expense involved in integrated circuit design. Therefore, a need exists for a multi-channel solid-state detector readout circuit that allows parallel reading of the detector cells and overcomes noise, erratic response, and integration problems. The present invention satisfies those needs, as well as others, and overcomes the deficiencies of previously developed solutions.

BRIEF SUMMARY OF THE INVENTION

The present invention is a multi-channel detector readout method and circuit that is capable of tracking the highest intensity input within a detector array. The circuit, which is preferably implemented as an integrated circuit, can be easily incorporated within a detection system such as a gamma camera system. The tracking is provided by sensing and multiplexing circuitry wherein a single detector cell input, which has been found to have the highest amplitude, is selected from a series of detector cell inputs and routed to an output along with a digital identifier. The integrated circuit employs noise reduction circuitry and techniques which reduces erratic switching effects and incorporates a number of features which simplify device integration within a system.

By way of example, and not of limitation, according to an aspect of the invention the digital part of circuitry is turned off while the amplifiers are is active to reduce noise in the amplifiers. According to another aspect of the invention, an analog sample and hold circuit is employed and externally triggered to receive data. According to a still further aspect of the invention, a winner take all circuit is employed to always select the channel with the largest output. When there is no input, however, there is random noise on each channel so the channel with the largest output may be a noise channel. By adding a threshold circuit with a bias higher than the noise level, when no input signal is applied, the threshold output is selected as the winner. As a result, the digital outputs do not switch, thereby eliminating switching noise. For example, in a 64-channel winter takes all circuit, there are 64 cells. A $65^{th}$ cell can be added and its input connected to an adjustable voltage source instead of an amplifier. The $65^{th}$ cell will always be the winner if the voltage input to that cell from the adjustable voltage source (threshold) is greater than any of the other input voltages. Therefore, switching noise can be reduced or eliminated when there are no input signals by setting the threshold above the noise voltage.

An object of the invention is to provide input channel selection based on absolute and relative signal amplitude.

An object of the invention is to provide a multi-channel detector readout having higher noise immunity.

Another object of the invention is to provide a digital output corresponding with the selected channel.

Another object of the invention is to provide an external control mechanism wherein the routing of input channels according to the highest intensity signal may be over-ridden by external command.

Another object of the invention is to provide a selection mechanism capable of high-speed operation.

Another object of the invention is to provide for testing of the multi-channel detector readout wherein the inputs lines and selection process may be verified without the need of disconnecting the integrated circuit.

Another object of the invention is to provide a circuit wherein the input lines may be individually conditioned prior to receipt by the input line selection circuitry.

Another object of the invention is to provide the capability of channel by channel masking of the input lines during the selection process so that faulty inputs may be masked out rather than rendering the entire circuit inoperative.

Further objects and advantages of the invention will be brought out in the following portions of the specification, wherein the detailed description is for the purpose of fully disclosing preferred embodiments of the invention without placing limitations thereon.

BRIEF DESCRIPTION OF THE SEVERAL VIEWS OF THE DRAWING(S)

The invention will be more fully understood by reference to the following drawings which are for illustrative purposes only:

DETAILED DESCRIPTION OF THE INVENTION

Figure 1:
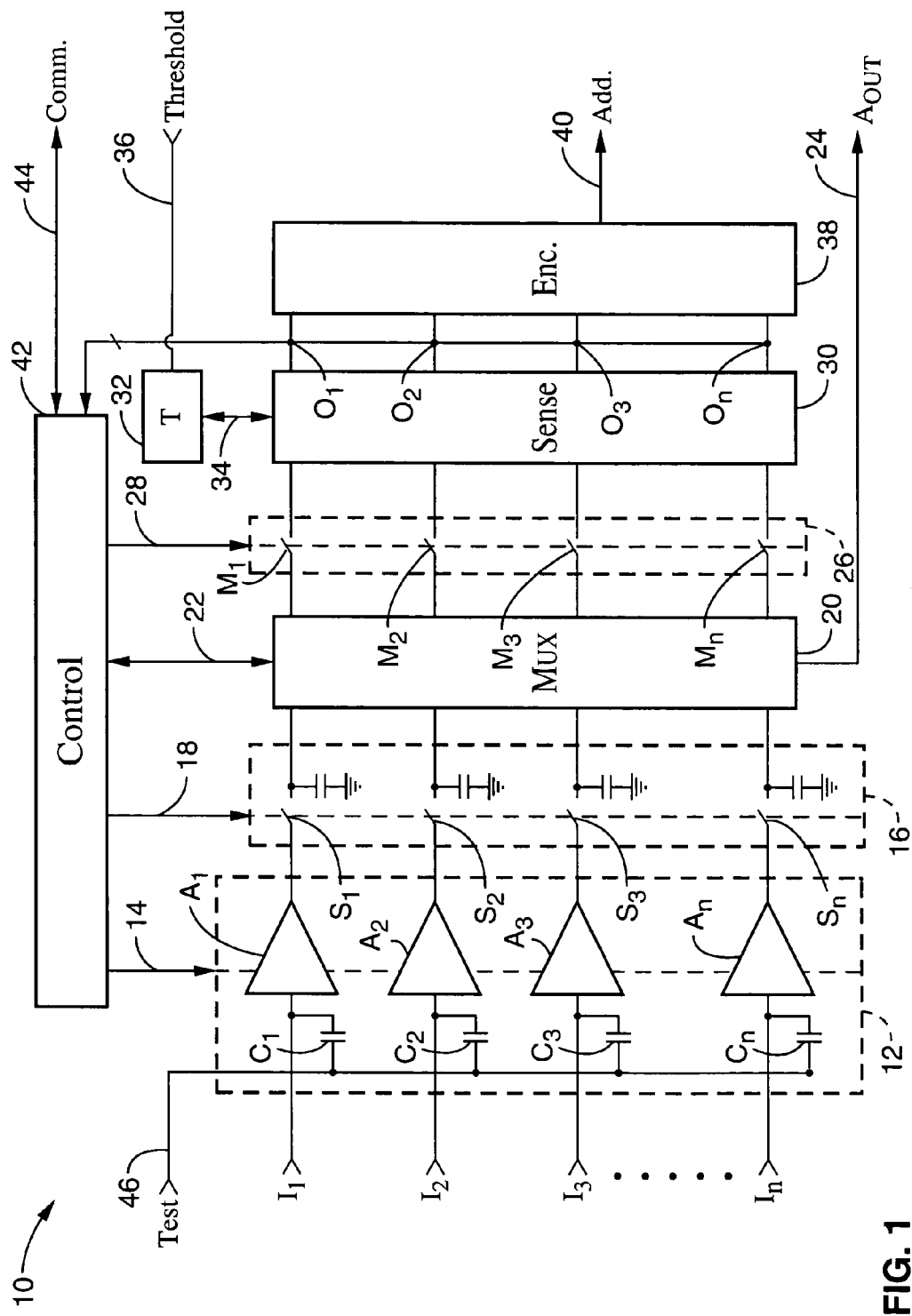
FIG. 1 is a block diagram of a multi-channel detector readout according to an embodiment of the present invention.
Figure 2:
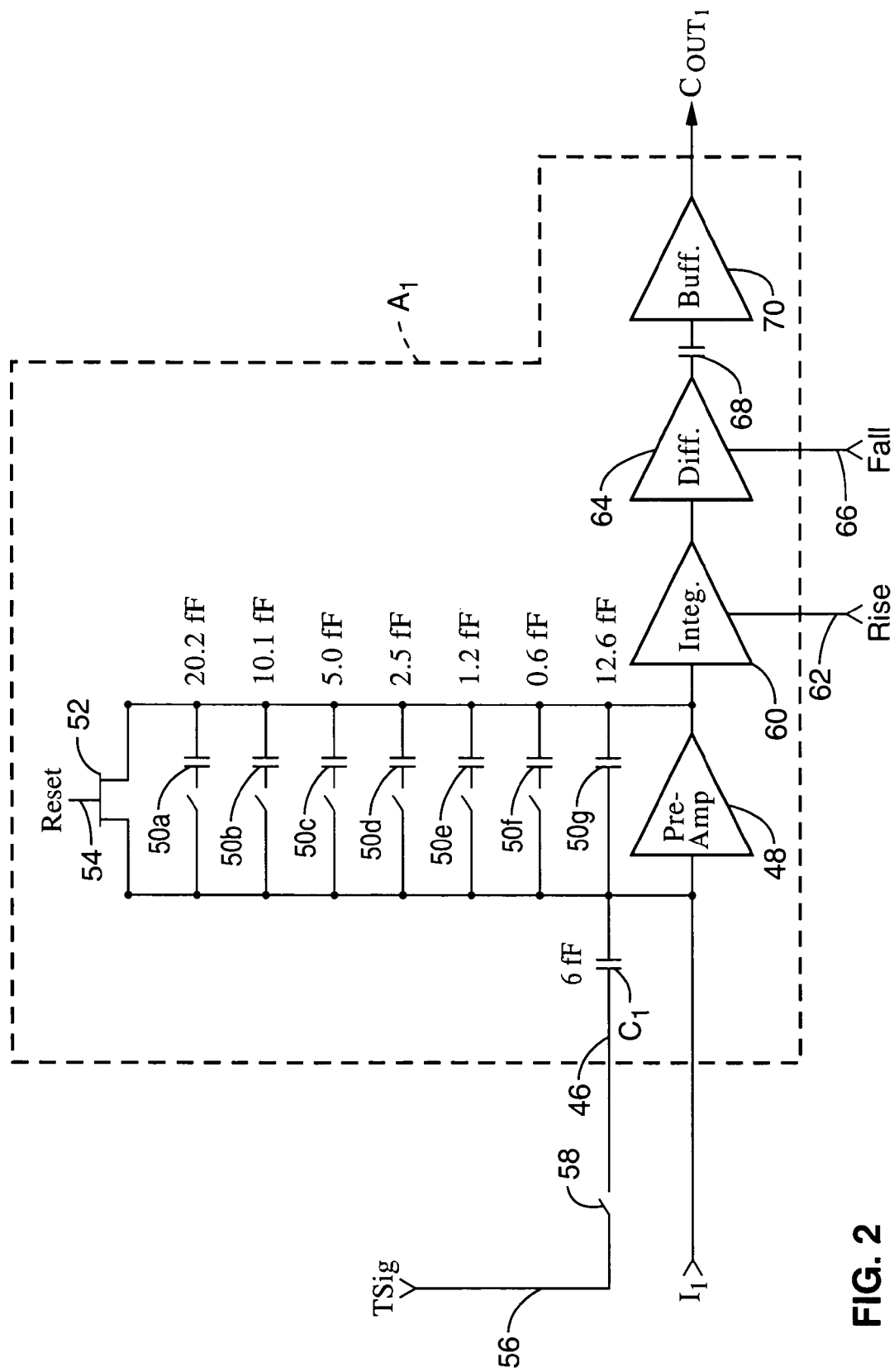
FIG. 2 is a schematic diagram of one of a plurality of conditioning circuits in the apparatus of FIG. 1, shown with switched capacitor gain selection in the pre-amplifier section and switched resistor attenuation selection on the test signal input.
Figure 3:
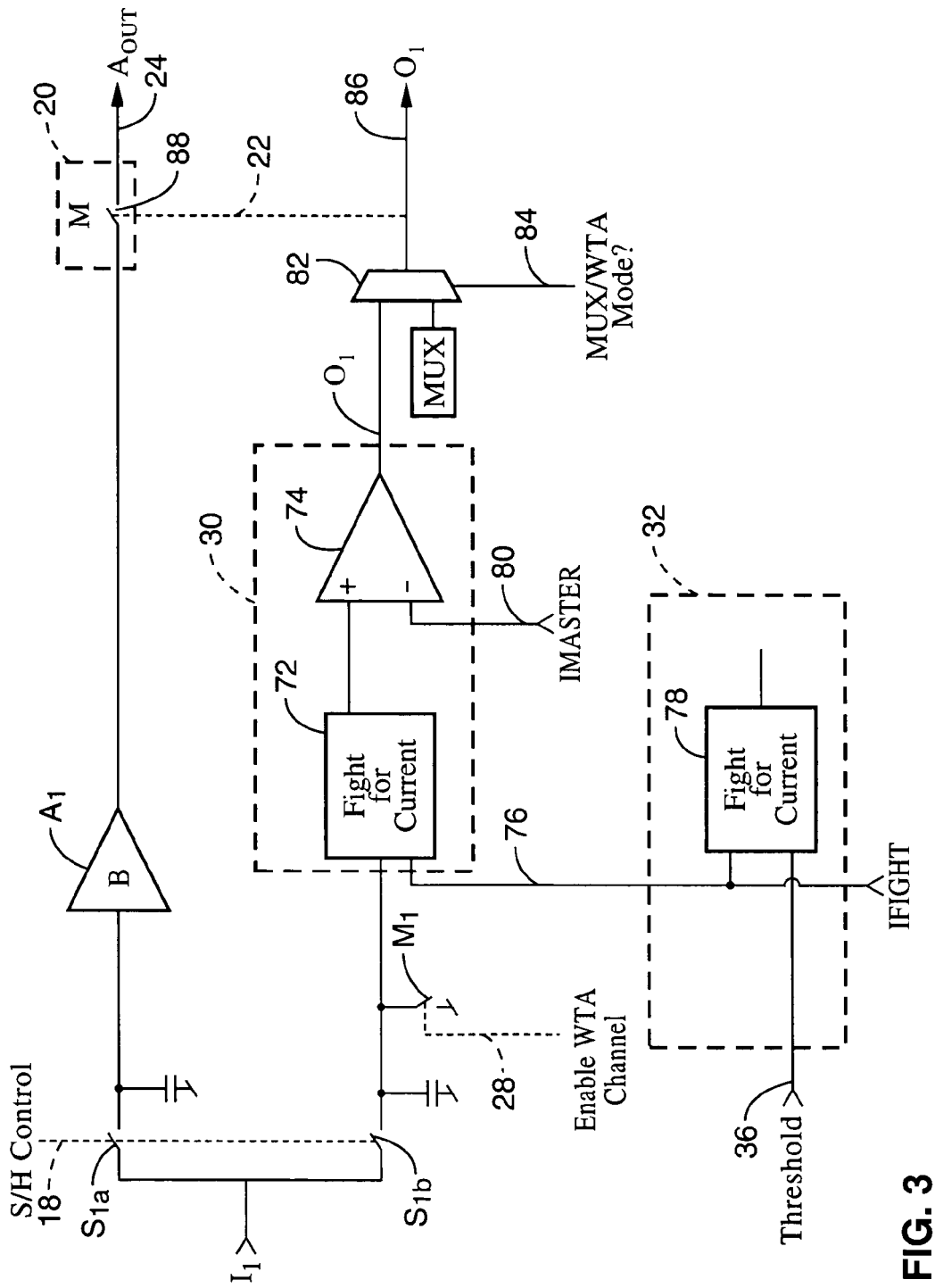
FIG. 3 is a block diagram showing the flow of sampling, sensing, and multiplexing within the multi-channel detector readout of FIG. 1.

Referring more specifically to the drawings, for illustrative purposes the present invention is embodied in the apparatus generally shown in FIG. 1 through FIG. 3. It will be appreciated that the apparatus may vary as to configuration and as to details of the parts, and that the method may vary as to the specific steps and sequence, without departing from the basic concepts as disclosed herein.

FIG. 1 shows an embodiment of a multi-channel solid state detector readout circuit 10 according to the present invention. In the example shown, the circuit includes a series of detector input lines $I_1$, $I_2$, $I_3$, through $I_n$ for receiving analog signals from a detector array (not shown). For purposes of this discussion, n is assumed to be sixty-four, corresponding to an eight by eight pixel detector array. However, the invention can be implemented having a wide range of aggregate channels. In addition, the detector described within this embodiment is presumed to be used within a gamma camera system in which the detector is a photodiode array that detects light from an array of CsI:Tl scintillator crystals. However, the invention can be applied to other types of detectors as well. Furthermore, the term "signal" is used herein in a general sense, and can encompass, for example, a signal from any type of detector or a noise signal that may be present in the absence of a signal from a detector.

Inputs $I_1$ through $I_n$ feed a conditioning stage 12 that conditions the input signals for the circuit. In the embodiment shown, conditioning stage 12 includes a series of controllable amplifiers $A_1$, $A_2$, $A_3$, through $A_n$ controlled through connection 14, with one controllable amplifier corresponding to each input line. The conditioned outputs then feed an optional sample and hold stage 16 containing a series of sample and hold circuits $S_1$, $S_2$, $S_3$, through $S_n$ controlled through connection 18, with one sample and hold circuit corresponding to each input channel. The sample and hold stage stabilizes the channel so that it is not changing during amplitude comparisons within the sense circuit, however it is not necessary for detector readout operation. By way of example and not of limitation, response times from a prototype integrated circuit without the sample and hold circuits to a channel amplitude change is less than 100 nS, and the maximum bandwidth is approximately 1 MHz. Sampled signals from the sample and hold circuits $S_1$, $S_2$, $S_3$, through $S_n$ feed a multiplexer 20 as signal channels. The multiplexer provides a channel selection circuit that allows selection of an input channel controlled through a connection 22 from the control section. A signal whose amplitude corresponds with the selected input channel is output on analog output line $A_{OUT}$ 24 of the multiplexer. The sampled signals also feed a masking stage 26 which contains a series of masking elements $M_1$, $M_2$, $M_3$, through $M_n$ capable of blocking out one or more channels, controllable via connection 28 from the control section, with one masking element corresponding to each channel. The channels which are not masked then feed a sense stage 30 which also receives signals from a threshold circuit 32 through connection 34. The threshold circuit is used to qualify the analog input samples so as to reduce erratic switching and resultant noise injection. Only those analog input samples which exceed the voltage of the threshold signal 36 are compared within the sense circuit 30. The sense circuit 30 provides for signal identification and may be implemented as a "winner-take-all" circuit, wherein the highest amplitude signal is selected and digital signals $O_1$, $O_2$, $O_3$, through $O_n$ are output to identify the channel. The digital outputs are received by a digital encoder 38 which converts the input data to seven data address bits 40 (six bits according to a set of sixty-four input lines and one bit for the threshold circuit) that identify which analog input line sample has the highest amplitude. A digital control section 42 directs the operation of the controllable circuit elements within the multi-channel detector readout 10 under the direction of a command interface connection 44 through which commands and data can pass to and from the digital control section 42. The digital outputs from the sense circuit $O_1$–$O_n$ are connected to the digital control section 42 which in turn controls the selection of which analog input signal is to be routed to the analog output. A common test input 46 provides individual test access via capacitors $C_1$, $C_2$, $C_3$, through $C_n$ to the conditioning stage 12.

FIG. 2 illustrates in greater detail the input conditioning and test circuitry for a single channel, $I_1$. The input $I_1$ is shown connected to the conditioning circuit $A_1$ as shown. A pre-amplifier 48 is configured to amplify the incoming signal $I_1$ according to the amount of gain set by the switched capacitors 50a through 50f and the non-switched capacitor 50g within the amplifier feedback loop. The values shown provide a dynamic range of four with six bits of resolution around a base value of 50 mV/1000 $e^-$ in sixty-four increments. The pre-amplifier is reset using FET 52 as a feedback resistor when the common reset line 54 is activated between the input and the output of pre-amplifier 48. The common reset line 54 is exemplified herein with four control bits, thereby providing 16 resistance levels within the FET. The levels of resistance (reset) allow for compensation for channel to channel differences in the dark current from the detector array. A test signal 56 is controlled through a switch 58. Test signal output 46 is fed through charge injection capacitor $C_1$ into the pre-amplifier 48 whose analog output is integrated by integrator 60 which shapes rise times as controlled by rise time input 62 that is common to the integrators for each channel. Output from the integrator 60 is received by a differentiator 64 which shapes the fall times as controlled by fall time input 66 which is common to differentiators for each channel. The A.C. coupled output 68 from the differentiator 64 is received by a buffer amplifier 70 which minimizes output offset variations in the channel output $COut_1$. Referring again to FIG. 1 the output from the conditioning circuitry is received by the sample and hold stage 16 after which the sampled signals are provided to the multiplexer 20 and sense circuit 30.

FIG. 3 shows the interrelations between the sample and hold, sense, and multiplex functions within a single channel $I_1$ of the multi-channel detector readout. The conditioned analog signal input $I_1$ is split between two sample and hold (S/H) circuits $S_{1a}$ and $S_{1b}$. Two sample and holds are preferred for each input channel so that individual S/H outputs are supplied to the multiplexer and the sense circuit. A single S/H could be utilized, however doing so would require a different channel enablement mechanism than the shunting switch $M_1$ as described, and may reduce the accuracy of the analog output. An upper S/H circuit $S_{1a}$ is controlled by an S/H control 18, which also controls a lower S/H circuit $S_{1b}$. The output from the lower S/H circuit $S_{1b}$ is enabled when the switch $M_1$, as controlled by enable signal 28, is not shunted to ground. Shunting of the lower sample and hold circuit $S_{1b}$ removes the input from consideration by sense circuit 30 while still providing the ability to selectively sample an analog channel.

The sense circuit performs identification of the channel having the highest amplitude signal. Various circuits may be used to perform the sense function, and exemplified within this embodiment is the use of a "winner-take-all" (WTA) circuit. For convenience, the term winner-take-all and WTA are often used herein when referring to the sense circuit function. Input signals to a winner-take-all circuit vie for a limited amount of current in a fight for current circuit 72 which is registered by a comparator 74. The highest input signal "takes" almost all the current and can therefore be easily discerned from the remaining signals. The fight for current circuit 72 typically employs non-linear amplifiers and is configured such that the current IFIGHT 76 is finally obtained by a single circuit. IFIGHT 76 is a common signal to all the channels of the device along with an additional fight for current circuit 78 contained within a portion of the threshold circuit 32. Additional details of an exemplary WTA can be found in W. W. Moses et al., A "Winner-Take-All" IC for determining the Crystal of Interaction in PET Detectors", IEEE Transactions on Nuclear Science NS-43, pp. 1615–1618 (1996), which is incorporated herein by reference. It should be appreciated that the described combination of multiplexer and sense circuitry provide for the identification of a single channel, the highest amplitude channel, which can provide a significant cost reduction over systems that process each of the detector channels through parallel sets of circuitry prior to the identification of the channel with the highest amplitude signal.

The threshold circuit 32 is supplied with a reference signal threshold 36 which establishes a noise floor threshold for the multi-channel detector readout, so that only input signals which exceed the noise floor threshold can compete with one another for the current IFIGHT 76 and be capable of "winning" the current within the fight for current circuit 72. It should be recognized that alternative circuitry can be employed to provide the thresholding of the input signals, for example an extra comparator added to each channel can compare the sampled signal with the threshold voltage and provide a result that is used for gating the digital result of the fight for current circuit or for otherwise disabling input channels which do not exceed the noise floor threshold. It can be seen however that implementing the thresholding circuit with an additional fight for current circuit requires less circuitry and provides a similar result.

The output from the fight for current circuit 72 is input to a current comparator 74 comparing the output current from the respective fight for current circuits with an IMASTER signal 80 to produce a digital output $O_1$ which is active only for the channel which exceeds the threshold value and has a higher amplitude signal than the remaining channels. A multi-input channel selector 82 within the digital control section (not shown) is driven by a MUX/WTA mode setting signal 84 to provide an output 86 from either the sense circuit outputs, exemplified herein by the WTA circuits, or from a stored multiplexer selection value latched within the digital control section in response to a command input. The output signal from the upper sample and hold $S_{1a}$ is buffered by amplifier $A_1$ to generate a sampled signal through a switch 88 within a portion of multiplexer 20 controlled through connection 22 with the digital output 86. Therefore under programmed commands to the digital control section, a sampled analog input channel is output as $A_{OUT}$ 24 which is either selected by command, or selected by the sense circuit 30.

Significant noise on the analog signals within the integrated circuit of the multi-channel detector readout can occur, which is due largely to the proximity of analog and digital circuitry within the device. Use of the thresholding circuit previously described provides a large measure of noise reduction as it reduces spurious switching that can occur between the signals within the sense circuit, implemented herein as a winner-take-all circuit, that would otherwise be responding to noise. The thresholding circuit provides a noise floor for the circuit so that channel selection is not being performed within the sense circuit as a result of spurious noise signals on the input channels. The threshold circuit provides a signal amplitude that must be exceeded before any channel can be selected within the sense circuit.

If the detector readout is used without the threshold circuit, the noise can create oscillations of the detector readout as the sense circuit rapidly switches between channels driven by the noise, which induces additional noise into the analog inputs which can in turn set up the oscillations. Additional noise correction measures are taken within the circuit to further remediate noise problems. The digital sections of the circuitry are shut-down during the sampling interval so that transitions in the digital signal are eliminated and therefore no coupling of digital noise into the analog input can occur. In addition circuitry within the multi-channel detector readout integrated circuit has been laid out in an effort to further isolate the digital and analog signals.

Digital control section 42 in FIG. 1 directs the operations of the multi-channel detector readout according to commands received on the communication channel 44. Outputs from the digital control section comprise: a 6-bit gain control to the pre-amplifiers, a 4-bit reset control for the preamplifier, a 1-bit test pulse enable for each channel, one analog test pulse output to the amplifier section, a 1-bit input enable for each channel of the sense circuit, a 1-bit multiplexer mode control to select user channel or sense circuit selection, and a 6-bit address of externally specified channel. A three-wire serial interface employing START/STOP bit sequencing supports a generally conventional command protocol used for communicating to the digital control section of the multi-channel detector readout. Data transfers are read from the chip or written to the chip as a 7-bit chip address with a 1-bit read/write flag which is followed by a register address and a data field. The preferable command structure is given as follows:

| Address |
T2 T1 T0 C3 C2 C1 C0 W
| Register |
R7 R6 R5 R4 R3 R2 R1 R0
| Data |
D7 D6 D5 D4 D3 D2 D1 D0

Settings T2 through T0 represent a type value for the integrated circuit, for example the multi-channel detector readout is preferably set with T2, T1, T0=0 1 0. Each type of circuit within a system using this command protocol preferably has a unique value for T2 through T0. Values for C3 through C0 are the chip address for the particular IC of the specified type. When the chip type and chip address bits within a given command match the type and setting for a given device, the device is selected. The address for each chip is preferably set by jumpers external to the chip which allows numerous multi-channel detector readouts to be used within a single system. R7 through R0 specify the register within the chip to be accessed, while D7 through D0 is the data to be read from or written to a specified register within the chip. A mode setting register within the integrated circuit allows the selection of four modes:

1. Channel Gain Mode—set the gain bits on a particular channel;
2. Multiplexer Input Control—load or read the multiplexer selection bits;
3. Multiplexer in WTA mode—set multiplexer to select a channel based on WTA output;
4. Test Input Control—Enable the test signal, set the amount of reset for the preamplifier, and/or disconnect the WTA input.

The digital control section of the multi-channel detector readout integrated circuit thereby provides digital control of the detection process along with integration related features. For example, the manual selection of detector channel provides for testing and debugging of the circuit, as the only way to register a detector channel is as output from the integrated circuit. Pre-amplifier ranging provides the ability to compensate for individual gain variations among the detector pixels. The provision of a test input allows the injection of known signals into the circuit, or selected channels thereof, to verify the operation of the circuitry.

Accordingly, it will be seen that this invention provides an integrated circuit for use in applications such as medical imaging, luggage inspection, instrumentation, and laboratories for handling multiple detector inputs from a detector array, such as a photodetector, and can be implemented with numerous variations obvious to those skilled in the art. In particular, the device described was designed for use with sixty input channels; however, any number of inputs can be accommodated. Specific conditioning circuitry was described having pre-amplifiers and associated circuitry; however, the type and configuration of the conditioning circuitry depends on the application and specific detectors in use. A thresholding circuit was described for reducing the effects of noise on circuit performance, yet variations of the described thresholding circuit can be implemented.

Although the description above contains many specificities, these should not be construed as limiting the scope of the invention but as merely providing illustrations of some of the presently preferred embodiments of this invention. Therefore, it will be appreciated that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

What is claimed is:

1. A method of identifying a maximum amplitude input signal within a plurality of analog input signals, comprising the steps of:
    (a) providing said plurality of analog input signals to an amplitude sensing stage,
    (b) generating a channel identification from said amplitude sensing stage corresponding to said maximum amplitude input signal of said plurality of analog input signals, said maximum amplitude input signal having an amplitude which has the highest signal amplitude of said plurality of analog input signals, and
    (c) passing said maximum amplitude input signal to an output using said channel identification.

2. The method of claim 1, wherein said amplitude sensing stage includes a noise floor threshold circuit and where said maximum amplitude input signal has an amplitude which exceeds a noise floor threshold.

3. The method of claim 2, further comprising the step of providing said channel identification to a digital control section wherein said digital control section ensures said maximum amplitude input signal is passed to said output.

4. The method of claim 3, further comprising the step of providing said plurality of analog input signals and a multiplexer selection signal to a multiplexer stage wherein said digital control section uses said channel identification to generate said multiplexer selection signal and said multiplexer selection signal is used by said multiplexer stage to pass said maximum amplitude input signal to said output.

5. The method of claim 4, further comprising the step of masking out selected inputs to said amplitude sensing stage in response to a control signal from said digital control section.

6. The method of claim 5, further comprising the step of shaping at least one analog input signal of said plurality of analog input signals prior to receipt of said plurality of analog input signals by said multiplexer stage.

7. The method of claim 6, further comprising the step of controllably amplifying at least one analog input signals of said plurality of analog input signals prior to receipt of said plurality of analog input signals by said multiplexer stage.

8. The method of claim 7, further comprising the step of retaining a sample of a signal level of at least one analog input signal of said plurality of analog input signals in a sample and hold circuit.

9. The method of claim 8, further comprising the step of suppressing digital noise by holding portions of said digital control section in a substantially static mode during time periods when said sample is taken so that reduced levels of digital noise are generated and coupled into said sample and hold circuitry and said multiplexer stage.

10. A method of identifying an acceptable maximum amplitude input signal within a plurality of analog input signals, comprising the steps of:
(a) receiving said plurality of analog input signals into a multi-channel detector readout device,
(b) sampling and holding a plurality of amplitudes corresponding to said plurality of analog input signals,
(c) receiving said plurality of amplitudes and a digital line select output signal into a multiplexer,
(d) receiving said plurality of amplitudes and a noise threshold reference signal into an amplitude sensing circuit,
(e) identifying said acceptable maximum amplitude input signal which exceeds said noise threshold reference signal and which has the maximum amplitude of said plurality of analog input signals,
(f) providing a digital line select output from said amplitude sensing circuit corresponding to said acceptable maximum amplitude input signal, and
(g) routing said acceptable maximum amplitude input signal to a singular output of said multiplexer.

11. The method as recited in claim 10, further comprising the steps of:
receiving said digital line select output from said amplitude sensing circuit into a digital control section, and
controlling said multiplexer using said digital line select output to pass a signal corresponding with said digital line select output from the amplitude sensing circuit.

12. The method as recited in claim 11, further comprising the steps of:
amplifying at least one input signal of said plurality of analog input signals in a controllable amplification stage preceding the sample and hold circuits, and
controlling the amount of amplification introduced by said controllable amplification stage with signals received therein from said digital control section.

13. The method as recited in claim 12, further comprising the step of providing compensation of channel to channel differences in background amplitude with a controllable resistance reset device connected between the input and output of the controllable amplification stage.

14. The method as recited in claim 13, further comprising the steps of:
masking selected input signals to said amplitude sensing circuit with a channel masking circuit, and
directing said channel masking circuit with said digital control section.

15. The method as recited in claim 14, further comprising the step of providing for the testing of said multi-channel detector readout circuit without disconnecting input signals connected thereto with a test circuit input connected to the individual inputs of said sample and hold circuits.

16. The method as recited in claim 15, further comprising the step of controlling test signal receipt by said sample and hold circuits with a switch which is connected between said test circuit input and said sample and hold circuits.

17. A method for identifying an acceptable maximum amplitude input signal within a plurality of analog input signals which exceeds a noise floor threshold, comprising the steps of:
(a) generating a plurality of amplitudes corresponding to said plurality of analog input signals and a digital line select output signal into a multiplexer,
(b) receiving said plurality of amplitudes and a noise threshold reference signal into an amplitude sensing circuit,
(c) identifying said acceptable maximum amplitude input signal which exceeds said noise threshold reference signal and which has the maximum amplitude of said plurality of analog input signals,
(d) providing a digital line select output from said amplitude sensing circuit corresponding to said acceptable maximum amplitude input signal, and
(e) routing said acceptable maximum amplitude input signal to a singular output of said multiplexer.

18. The method as recited in claim 17, further comprising the steps of:
receiving said digital line select output from said amplitude sensing circuit into a digital control section, and
controlling said multiplexer using said digital line select output to pass a signal corresponding with said digital line select output from the amplitude sensing circuit.

19. The method as recited in claim 18, further comprising the steps of:
amplifying at least one input signal of said plurality of analog input signals in a controllable amplification stage preceding the sample and hold circuits, and
controlling the amount of amplification introduced by said controllable amplification stage with signals received therein from said digital control section.

20. The method as recited in claim 19, further comprising the step of providing compensation of channel to channel differences in background amplitude with a controllable resistance reset device connected between the input and output of the controllable amplification stage.

* * * * *